United States Patent [19]

Chilton

[11] 4,100,899
[45] Jul. 18, 1978

[54] CARBURETOR HEATER

[76] Inventor: Robert S. Chilton, Route 1, Lawton, Iowa 51030

[21] Appl. No.: 741,317

[22] Filed: Nov. 12, 1976

[51] Int. Cl.² .......................................... F02M 31/08
[52] U.S. Cl. .......................... 123/122 A; 123/122 H; 123/124 R
[58] Field of Search ............ 123/141, 122 A, 122 AB, 123/119 DB, 124 R, 122 H

[56] References Cited

U.S. PATENT DOCUMENTS

| | | | |
|---|---|---|---|
| 2,001,669 | 5/1935 | Smith | 123/122 A X |
| 2,133,775 | 10/1938 | Weismeir | 123/122 A |
| 2,227,462 | 1/1941 | Morris | 123/122 A |
| 2,273,957 | 2/1942 | Harrel | 123/141 X |
| 2,650,582 | 9/1953 | Green | 123/141 X |
| 2,977,205 | 3/1961 | Austin | 123/141 X |
| 3,762,385 | 10/1973 | Hollnagel | 123/122 A |
| 3,788,292 | 1/1974 | Lee, Jr. | 123/122 A |
| 3,797,468 | 3/1974 | Fisher | 123/122 A X |
| 3,911,881 | 10/1975 | Lee, Jr. | 123/122 A X |

Primary Examiner—Charles J. Myhre
Assistant Examiner—Ira S. Lazarus
Attorney, Agent, or Firm—Henderson, Strom, Sturm, Cepican & Fix

[57] ABSTRACT

An apparatus for increasing vaporization of an air/fuel mixture before combustion in an engine is disclosed. Partially atomized air/fuel mixture from a carburetor is directed into a dual-chambered apparatus, wherein the air/fuel mixture is further vaporized through the use of heat conducted from recycled exhaust gases of the engine. The vaporized fuel mixture is then directed into the manifold of the engine for combustion.

5 Claims, 3 Drawing Figures

CARBURETOR HEATER

BACKGROUND OF THE INVENTION

This invention relates generally to apparatus for improving the combustion characteristics of an internal combustion engine, and specifically to apparatus which increases the vaporization of the air/fuel mixture prior to combustion.

The efficiency of fuel combustion has become increasingly important in recent years due to pressures both from internal concerns and foreign sovereignties. The gap between the need for internal combustion engine machines and the availability and cost of fuel triggered a demand for more efficient combustion. The pressures created by these demands have resulted in numerous technological advances in the art of fuel combustion, among which is that set forth in the instant disclosure.

The prior art teaches that before fuel is combusted in an internal combustion engine, it should be mixed with air and it should be atomized, to provide for greater control and efficiency. This mixing and atomizing is ordinarily performed by a carburetor, before the fuel is introduced into the combustion chamber. The prior art teaches that where the air/fuel mixture is vaporized, the efficiency of combustion is enhanced.

One method of achieving vaporization of the air/fuel mixture is to expose the mixture to heat sufficient to promote the vaporization. U.S. Pat. No. 3,788,292 describes an apparatus which so utilizes heat to induce vaporization. Reduced to its simplest elements, the apparatus therein disclosed operates as follows: The air/fuel mixture is directed into an elongated chamber with a baffle located along the center, creating in effect two chambers. The mixture may flow from the first to the second chamber only by passing through portals in the baffle. A third chamber having a common wall with at least one of the two previously mentioned chambers is provided for the reception of heated exhaust gases. The air/fuel mixture, which has absorbed some heat from the third chamber via the common wall, is eventually moved past the baffle between the first and second chambers, and through a pipe which makes its course through the third chamber. As the mixture travels through this pipe, it absorbs further heat to complete the vaporization. Means are then provided to introduce the vaporized air/fuel mixture into the engine.

While the instant invention also utilizes exhaust gases as a source of heat and involves a multi-chambered apparatus to effect vaporization, the uncomplicated scope of its design will be seen to promote vaporization in a fashion more simple and efficient than that disclosed in U.S. Pat. No. 3,788,292. Also, the more direct path of the air/fuel mixture fluid flow disclosed in the instant invention has the beneficial side effect of eliminating problems involved with a "cold start", a problem solved in prior inventions by more complex means. Further, the simplicity of design lends itself well to the manufacture of a highly reliable product.

The instant invention realizes the advantages of vaporization of the air/fuel mixture in an internal combustion engine, while avoiding some disadvantages of prior inventions, through the use of a novel apparatus.

SUMMARY OF THE INVENTION

It is therefore an object of this invention to provide a novel apparatus for vaporizing air/fuel mixtures for engines.

It is a further object of this invention to provide a novel vaporization system which utilizes exhaust gases from the engine.

It is a further object of this invention to provide a novel apparatus for vaporizing air/fuel mixtures which is uncomplex to install.

It is a still further object of this invention to provide a novel apparatus for vaporizing air/fuel mixtures which operates between the carburetor and the intake points of the engine manifold.

Another object of this invention is to provide a novel method of recycling exhaust gases from an engine to perform a useful function.

It is still a further object of this invention to provide a novel apparatus for vaporizing air/fuel mixtures which is durable of construction, inexpensive of manufacture, and extremely effective in use.

It is a further object of this invention to provide a novel apparatus that allows for a supplemental pneumatic means to contribute to the vaporization of the air/fuel mixture.

These and other objects are accomplished by providing an apparatus for increasing vaporization of an air/fuel mixture before combustion in an engine. Partially atomized air/fuel mixture from a carburetor is directed into a dual-chambered apparatus, wherein the air/fuel mixture is further vaporized as the use of heat conducted from recycled exhaust gases of the engine. The vaporized fuel mixture is then directed into the manifold of the engine for combustion.

BRIEF DESCRIPTION OF THE DRAWINGS

The advantage of this invention will become apparent upon consideration of the following detailed disclosure of the invention, especially when taken in conjunction with the accompanying drawings wherein.

DESCRIPTION OF THE PREFERRED EMBODIMENTS

In the usual internal combustion engine, the fuel is first partially atomized by a carburetor and mixed with air before combustion. It should be understood that throughout this disclosure the terms "atomize" and "vaporize" will be frequently referred to, and to prevent confusion, the term "atomize" should be accepted as referring to the division of a substance into minute particles, as where liquid gasoline is separated into many small droplets. "Vaporization" will refer more to a change of state in the substance, as where liquid gasoline undergoes evaporation whereby the gasoline is reduced into its gaseous components. If the partially atomized air/fuel mixture is then vaporized by exposing the mixture to heat conducted from the exhaust gases of the engine, the efficiency of combustion is increased.

This result is one of the advantages realized by the instant invention.

Figure 1:
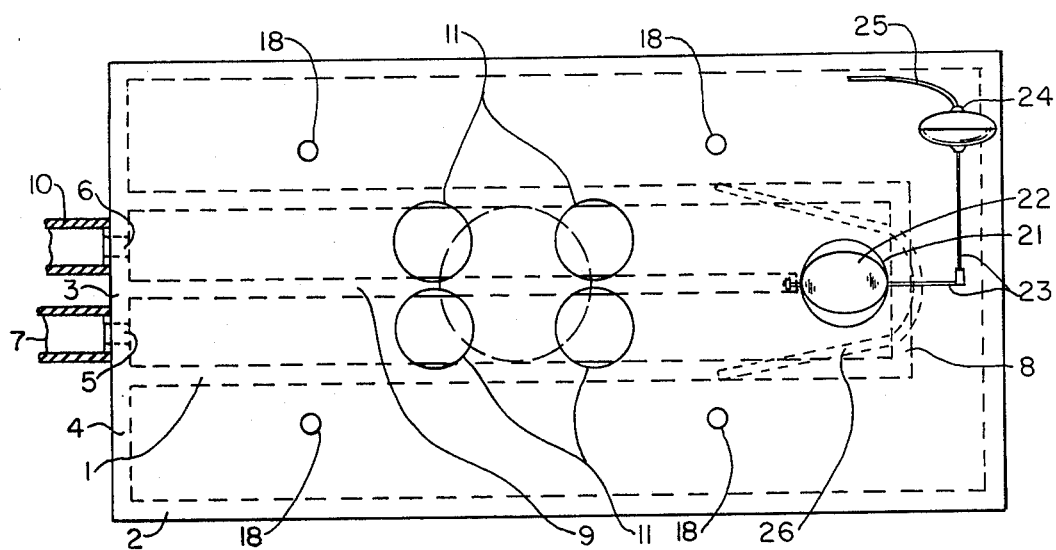
FIG. 1 is a top plan view of the air/fuel mixture vaporizing apparatus.

Referring now to FIG. 1, the basic elements of a preferred embodiment of the invention include a closed metal container 1 located within a second closed metal container 2. Preferably, the material forming the two containers, or at least container 1, will have as one of its properties high thermal conductivity, although any other suitable material will suffice. Also, preferably, the exterior of closed metal container 2 will be insulated with a material suitable to prevent the excess escape of heat from its exterior surface. The first container 1 is structurally attached at 3 to a wall 4 of the second container 2. An inlet port 5 and an outlet port 6 are positioned to allow heated exhaust gases from the engine ingress and egress to the interior of closed container 1. The heated exhaust gases flow to the opposite end 8 of container 1 and circumvent baffle 9. The exhaust gases then flow toward and through outlet port 6 and exit via a second exhaust hose 10. The gases are eventually exited through the main exhaust system of the engine. The material of which container 1 is constructed then becomes hot as the heated exhaust gases circulate within container 1.

Figure 2:
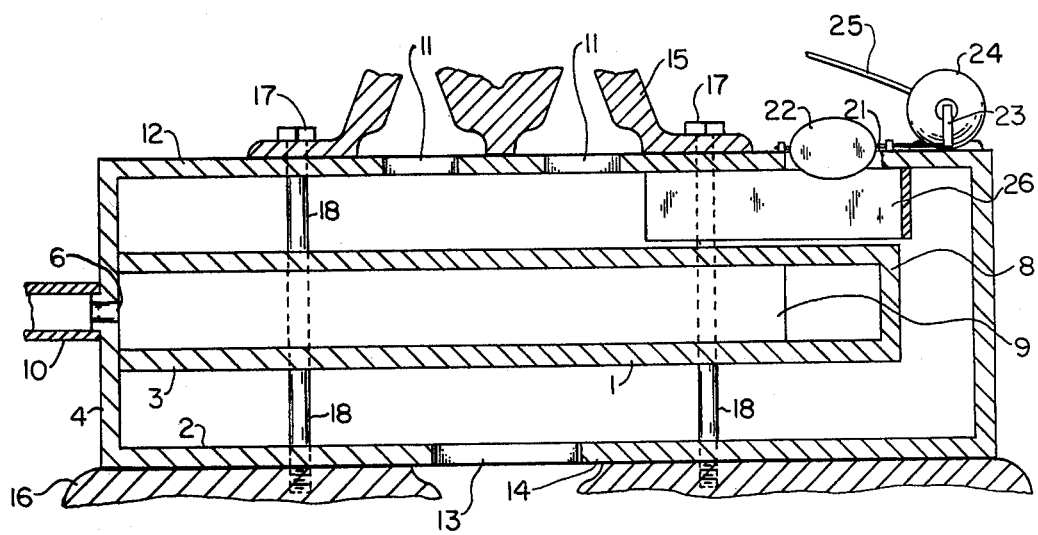
FIG. 2 is a cross-sectional side view of the air/fuel mixture vaporizing apparatus mounted and affixed between a carburetor and a manifold block.

FIG. 2 depicts the apparatus as affixed between a carburetor 15 and the manifold 16. The apparatus is held stationary with the use of mounting bolts 17, placed through openings 18 located in the top 12 and the bottom 14 of the closed container 2. FIG. 2 illustrates the uncomplicated fashion by which the apparatus may be installed in a common internal combustion engine, the ease of installation owing in part, at least, to the simple and uncluttered design of the apparatus.

As viewed in FIG. 2, the air/fuel mixture enters the closed container 2 through the openings 11 in the top 12 of the container 2. The hot surface of container 1 then transmits its heat by convection and conduction to the air/fuel mixture as the mixture flows over and around the interior closed container 1, causing the air/fuel mixture to vaporize. This vaporized air/fuel mixture exits the closed container 2 through the opening 13 in the bottom 14 of container 2 on its way to the combustion chamber of the engine.

Figure 3:
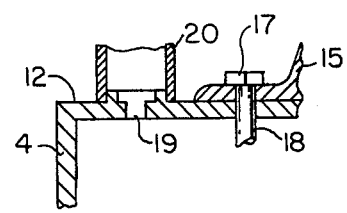
FIG. 3 is a close-up cross-sectional side view of the air/fuel mixture vaporizing apparatus featuring a supplemental air intake apparatus.

The operation of the apparatus is improved by providing a supplemental source of air for the closed container 2. FIG. 3 illustrates one method of effecting this. An opening 19 through the top 12 of the container 2 provides the entrance for the air, which flows through hose 20. Air flow is promoted into the container 2 by a suction occuring within container 2 in normal operation.

FIGS. 1 and 2 illustrate another method of effecting a supplemental air supply. An opening 21 is provided in the top 12 of container 2 wherein a butterfly assembly 22 is affixed. The butterfly assembly 22 is connected via a control linkage 23 to a vacuum diaphragm 24, which is connected via a vacuum hose 25 to the carburetor 15 in known manner. The airflow through the opening 21 is regulated in direct response to the airflow through the carburetor 15, thereby providing more air when necessary. The airflow through the opening 21 is directed toward the openings 11 provided for the output of the carburetor 15 by a baffle 26. Such a directed airstream contributes beneficially to the further mixing of the air/fuel mixture.

It will be understood that vaious other changes of the details, materials, steps, arrangements of parts and uses which have been herein described and illustrated in order to explain the nature of the invention will occur to and may be made by those skilled in the art, upon a reading of this disclosure, and such charges are intended to be included within the principles and scope of this invention.

For example, different embodiments may be devised which depend basically upon the same teachings as herein disclosed. More than one interior closed container could be utilized, or varied paths for the exhaust gases could be devised. Also, it would be quite possible to employ physical surface configurations most unlike those listed herein, as by the use of spheres or cylinders.

Also included should be other varied methods by which a supplemental air supply for container 2 could be accomplished. For instance, while a butterfly device is shown in one of the above embodiments as the controlling apparatus by which the influx of air is passed, a small carburetor could be used to effect the same purpose. Further, an unused barrel of the main carburetor 15 could also be used to supply the input device.

While the embodiment illustrated in FIGS. 1 and 2 portrays an apparatus suited for use with a four-barrel carburetor, it should be obvious that the number of openings may be varied to accommodate other carburetors, or the number and size of the openings may be varied with respect to any given carburetor, with violation of the integrity of the basic novel invention.

I claim:

1. An apparatus for improving the combustion characteristics of an air/fuel mixture for an engine, the engine having a carburetor for introducing an air/fuel mixture into the intake port of an engine block, the apparatus being so positioned to allow a fluid flow from the carburetor through the apparatus and into the intake port of the engine block, said apparatus comprising:
   (a) a first closed chamber having a top and an opposing bottom, including first and second openings in said top and bottom, respectively and further including a supplemental opening therein;
   (b) a second closed chamber positioned within said first chamber allowing a fluid flow passage from said first opening in said first closed chamber to said second opening in said first closed chamber;
   (c) means for introducing and means for exhausting warm gases into and out of said second closed chamber, such that the air/fuel mixture from the carburetor is passed through said first opening in said first closed chamber, around said second closed chamber where the air/fuel mixture is at least partially vaporized, and through said second opening in said closed first chamber, through the intake port of the engine;
   (d) a baffle between said means for introducing warm gases and said means for exhausting the warm gases from said second closed chamber, such that said second closed chamber is more uniformly heated by the exhaust gases; and
   (e) pneumatically activated valve means for controlling the volume of fluid flow into said first chamber through said supplemental opening, wherein the pneumatically activated valve means is responsive to pressure variations of the fluid flow through the apparatus.

2. The apparatus of claim 1 wherein said pneumatically activated valve means is in fluid flow communication with the carburetor, and said pneumatically activated valve means is responsive to pressure variations of the fluid flow through the carburetor.

3. The apparatus of claim 2 wherein:
(a) said valve means further comprises a butterfly apparatus;
(b) said pneumatically activated valve means further comprises a vacuum diaphragm device, said device including a diaphragm within a sealed chamber that is in fluid flow communication with the carburetor and is responsive to pressure variations of the fluid flow through the carburetor; and
(c) said diaphragm is mechanically linked to said butterfly apparatus, whereby said butterfly apparatus is mechanically responsive to fluctuations of said diaphragm caused by said diaphragm's response to pressure variations of the fluid flow through the carburetor.

4. The apparatus of claim 1 wherein said pneumatically activated valve means further comprises a carburetor.

5. The apparatus of claim 1 wherein said top having said first opening further includes additional openings whereby the air/fuel mixture is introduced to the interior of said first chamber through a plurality of openings.

* * * * *